United States Patent Office 2,946,825
Patented July 26, 1960

2,946,825

2-HYDROXY-3-CHLOROALKYL ETHERS OF ACETYLENIC ALCOHOLS

Roger F. Monroe and Arthur W. Anderson, Midland, Mich., assignors to The Dow Chemical Company, Midland, Mich., a corporation of Delaware No Drawing. Filed Mar. 3, 1958, Ser. No. 718,473

5 Claims. (Cl. 260—611)

The present invention relates to 2-hydroxy-3-chloroalkyl ethers of acetylenic alcohols and is more particularly concerned with a new and novel class of compounds which conveniently may be characterized by the general formula

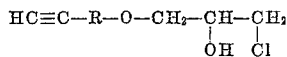

wherein R represents a bivalent saturated hydrocarbon radical containing from 1 to 8 carbon atoms, inclusive six of which may be joined together to form a ring. The compounds of the present invention have been tested and found to be useful as the active toxic ingredient in compositions employed for the control of seeds and seedlings of undesired vegetation. These compounds are also useful as corrosion inhibitors and as intermediates in the preparation of the epoxy ethers of acetylenic alcohols of our concurrently filed application Serial No. 718,470. These latter compounds are also useful as herbicides and as corrosion inhibitors.

The compounds of the present invention conveniently may be prepared by reacting epichlorohydrin and an acetylenic alcohol in the presence of a metallic chloride catalyst. Good results are obtained when employing at least equimolar proportions of the reactants and preferably when employing a molar excess of the alcohol. The reaction proceeds readily and smoothly at temperatures of from 30° to 80° C.

In accordance with the present invention the new compounds can be prepared by reacting epichlorohydrin with about a molar proportion, and preferably with up to a 30 percent excess, of the acetylenic alcohol. The reaction is somewhat exothermic and external cooling is often necessary to maintain the temperature below about 80° C. Upon completion of the reaction the desired product can be obtained by conventional methods such as fractional distillation under reduced pressure.

The following examples are illustrative of the present invention but are not to be construed as limiting.

Example 1

1375 parts by weight (14.9 moles) of epichlorohydrin were slowly added with stirring to 2417 parts by weight (19.5 moles) of 1-ethynylcyclohexanol containing 10 parts by weight of anhydrous stannic chloride. The temperature was maintained between 50° C. and 65° C. by external cooling. Stirring and cooling were continued for 60 minutes, after which the reaction mixture was washed with water and fractionally distilled under reduced pressure to obtain a 1-chloro-3-(1-ethynylcyclohexyloxy)-2-propanol product boiling at 95–97° C. at 0.8 mm. pressure.

Example 2

1375 parts by weight (14.9 moles) of epichlorohydrin were slowly added with stirring to 1680 parts by weight (20 moles) of 2-methyl-3-butyn-2-ol containing 10 parts by weight of anhydrous stannic chloride. The temperature was maintained about at between 50 and 65° C. by external cooling. Upon completion of the reaction, the reaction mixture was washed with water and fractionally distilled under reduced pressure to obtain a 1-chloro-3-(1,1-dimethylpropynyloxy)-2-propanol product boiling at 73° C. at 20 mm.

Example 3

In the manner of Example 2, 1375 parts by weight (14.9 moles) of epichlorohydrin was slowly added to 1700 parts by weight (13.5 moles) of 3,5-dimethyl-1-hexyn-3-ol containing 10 parts by weight of anhydrous stannic chloride and the temperature maintained between 50° C. and 65° C. by external cooling. Upon completion of the reaction, the reaction mixture was washed with water and fractionally distilled under reduced pressure to obtain a 1-chloro-3-(1-isobutyl-1-methylpropynyloxy)-2-propanol product boiling at 78° C. at 0.6 mm.

Example 4

In the manner of Example 2 employing 1900 parts by weight (34 moles) of propargyl alcohol in place of 3-methyl-1-butynol there was obtained a 1-chloro-3-propynyloxy-3-propanol product.

It is thus apparent that substantially any acetylenic alcohol may be employed in accordance with the present invention. Some of the more common acetylenic alcohols in addition to those shown in the examples which are meant to be within the scope of the present invention are, for example, 3-butyn-1-ol, 4-pentyn-1-ol, 2-hexyn-1-ol, 5-heptyn-1-ol, and the like.

The compounds of the invention are useful as herbicides and may be employed for the control of undesirable vegetation. For such use the compounds may be dispersed on a finely divided carrier and employed as dusts. The new compounds may also be employed in oils, or as constituents in water emulsions or water dispersions with or without a wetting, dispering or emulsifying agent. In a representative operation, controls of *Phalaris canariensis* was obtained with aqueous compositions containing 100 parts by weight of 1-chloro-3-(1-isobutyl-1-methyl-2-propynyloxy)-2-propanol per million parts by weight of ultimate mixture.

The compounds of the present invention are also useful as corrosion inhibitors in halogenated hydrocarbon solvent systems. Further the compounds are useful in preparing the 2,3-epoxypropyl ethers of acetylenic alcohols of our copending application Serial No. 718,470 filed even date herewith. The latter compounds are useful as herbicides.

We claim:

1. A 2-hydroxy-3-chloropropyl ether of an acetylenic alcohol having the formula

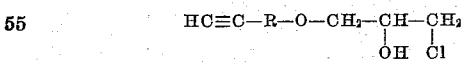

wherein R is a bivalent saturated hydrocarbon radical having from 1 to 8 carbon atoms, inclusive six of which may be joined together to form a ring.

2. 1-chloro-3-(1-ethynylcyclohexyloxy)-2-propanol.

3. 1-chloro-3-(1,1-dimethylpropynyloxy)-2-propanol.

4. 1-chloro-3-(1-isobutyl-1-methylpropynyloxy)-2 - propanol.

5. 1-chloro-3-propargyloxy-2-propanol.

References Cited in the file of this patent

UNITED STATES PATENTS

| | | |
|---|---|---|
| 2,327,053 | Marple et al. | Aug. 17, 1943 |
| 2,657,241 | Mast et al. | Oct. 27, 1953 |
| 2,802,878 | Monroe et al. | Aug. 13, 1957 |